(12) United States Patent
Bronnert

(10) Patent No.: US 7,640,850 B2
(45) Date of Patent: Jan. 5, 2010

(54) VACUUM CHAMBER

(76) Inventor: Herve' X. Bronnert, 21495 Partridge Ct., Brookfield, WI (US) 53005

( * ) Notice: Subject to any disclaimer, the term of this patent is extended or adjusted under 35 U.S.C. 154(b) by 678 days.

(21) Appl. No.: 11/290,287

(22) Filed: Nov. 30, 2005

(65) Prior Publication Data

US 2006/0115565 A1   Jun. 1, 2006

Related U.S. Application Data

(60) Provisional application No. 60/632,653, filed on Nov. 30, 2004.

(51) Int. Cl.
*A23L 3/16* (2006.01)
*A23C 3/02* (2006.01)

(52) U.S. Cl. .............................. 99/454; 99/472; 99/453

(58) Field of Classification Search ................... 99/472, 99/473, 477, 454, 453
See application file for complete search history.

(56) References Cited

U.S. PATENT DOCUMENTS

| 3,938,534 | A | * | 2/1976 | Akizawa | .................. 134/104.3 |
| 5,003,869 | A | * | 4/1991 | Fabricius | ...................... 99/453 |
| 5,672,374 | A | * | 9/1997 | McCabe | ..................... 426/635 |
| 6,513,422 | B1 | * | 2/2003 | Palm | ........................... 99/454 |

* cited by examiner

*Primary Examiner*—Reginald L Alexander
(74) *Attorney, Agent, or Firm*—Foley & Lardner LLP

(57) ABSTRACT

A vacuum tank for removing air from a food product includes an inner sleeve forming a first and second region in the tank. Air is removed from the food product as the food product moves from the first region to the second region of the tank.

16 Claims, 3 Drawing Sheets

VACUUM CHAMBER

CROSS-REFERENCE TO RELATED PATENT APPLICATIONS

This application is a an application claiming the benefit under 35 U.S.C. § 119(e) from U.S. Provisional Application No. 60/632,653, filed Nov. 30, 2004, and incorporated herein by reference in its entirety.

BACKGROUND OF THE INVENTION

The present invention relates generally to the field of vacuum chambers, and more particularly, to a vacuum chamber for use with viscous food processing.

Commercial food products that include viscous materials are typically mixed in a tank. This process adds air to the resultant viscous food product. If the air in the viscous product is not effectively removed, the viscous product will be processed with the air and/or packaged along with the air. This inclusion of air may prohibit effective processing of the food product. Further, air in the food product may result in the food product settling to a lesser volume as the air is released from the product.

In an attempt to minimize the amount of air that is included in a liquid food product being processed, the liquid food product is sent through a vacuum chamber. Air in the liquid food product separates from the food product in the vacuum chamber and is removed by means of a vacuum pump. This system is effective for products of low viscosity such as milk. However, traditional vacuum chambers do not work well with a more viscous food product. Traditional vacuum chambers result in foaming of the viscous food product. Additionally, traditional vacuum chambers do not effectively remove the air from viscous food product. Accordingly, a vacuum chamber system that effectively removes air from viscous food product without causing foaming would be advantageous.

SUMMARY OF THE INVENTION

One embodiment of the invention relates to a vacuum chamber having a vacuum tank with a product inlet and a product outlet. A circular sleeve is located within the vacuum tank creating a first zone between the sleeve and inner wall of the vacuum tank, and a second zone between the inner wall of the circular sleeve and the bottom of the vacuum tank. The product inlet is located within the first zone, and the product outlet is located within the second zone. A vacuum pump is connected to the vacuum tank to remove air from the food product as it moves from the first zone to the second zone.

In another aspect of the invention, a recirculation system is added to recirculate food product that exits from the second zone back into the first zone.

In a further embodiment a vacuum tank includes an inner wall and a first product inlet, a second product inlet, and a product outlet. A sleeve located within the tank includes an outer surface and an opposing inner surface. The sleeve defines a first zone between the inner wall of the tank and the outer surface of the sleeve, and a second zone between the inner surface of the sleeve and a bottom of the tank. A recirculation system includes a pump configured to return a portion of the food product to the first zone after the food product exits the tank through the product outlet. The tank includes a recirculation inlet located in the first zone. A vacuum pump is operatively connected to the tank in a region above the first and second zones and configured to remove air from the food product as the food product moves from the first zone to the product outlet.

In still a further aspect of the invention a method for removing air from a food product includes providing a fluid food product through a product inlet into a tank having a sleeve located therein. The food product is moved upwardly in the tank between an inner wall of the tank and an outer surface of the sleeve. The food product is then moved over an upper edge of the sleeve and downwardly over an inner surface of the sleeve. A vacuum in the tank is provided in a region above the upper edge of the sleeve and removes air from the food product as the food product moves over the upper edge of the sleeve.

DETAILED DESCRIPTION OF THE PREFERRED EMBODIMENTS

Figure 1:
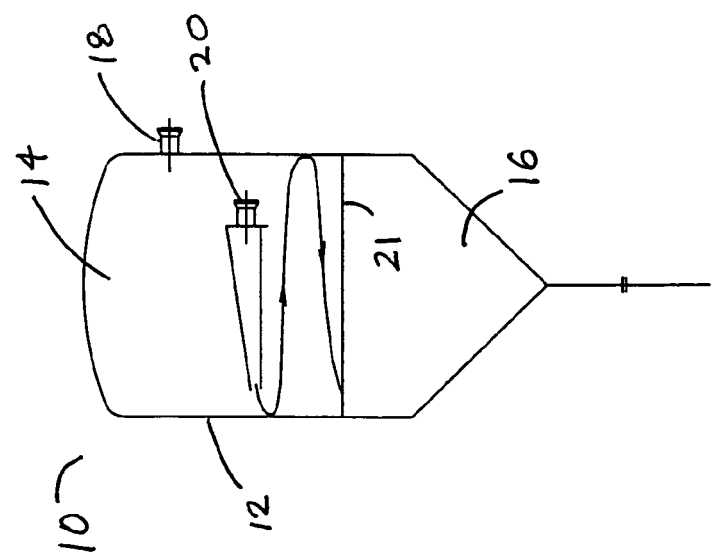
FIG. 1 is a sketch of a traditional vacuum chamber for processing liquid based products.

Referring to FIG. 1, a traditional vacuum chamber 10 includes a tank 12 having an upper portion 14 and a lower portion 16. A vacuum connection 18 is located through the tank 12 in upper portion 14. A vacuum pump is operatively secured to the vacuum connection 18 with a vacuum line. This maintains a vacuum within tank 12. A product inlet 20 is located through the tank 12 in the upper portion 14 below the vacuum connection 18. The food product is introduced tangentially into the tank 12 and circulates downwardly around the inner wall of tank 12 until it hits the surface 21 of product level within tank 12. The food product falls by gravity and fills the lower part 16 of the tank 12. The space occupied by the vacuum in the chamber is defined by the product surface 21 and the upper chamber design. The food product is therefore exposed to the vacuum while it is swirling around the inner wall of tank 12 and while it is on the surface of the product level 21 within tank 12. Air that is in the food product is removed. This system is used with food products having lighter viscosity, such as milk. However with more viscous food products in this system, the food product may foam. This is particularly the case when the product comes directly from the formulation and has a lot of air in it. This foaming action is problematic. Further, when the food product is made from more than one food substance, it is important to ensure that the food product does not separate while it is in the vacuum chamber.

Figure 3:
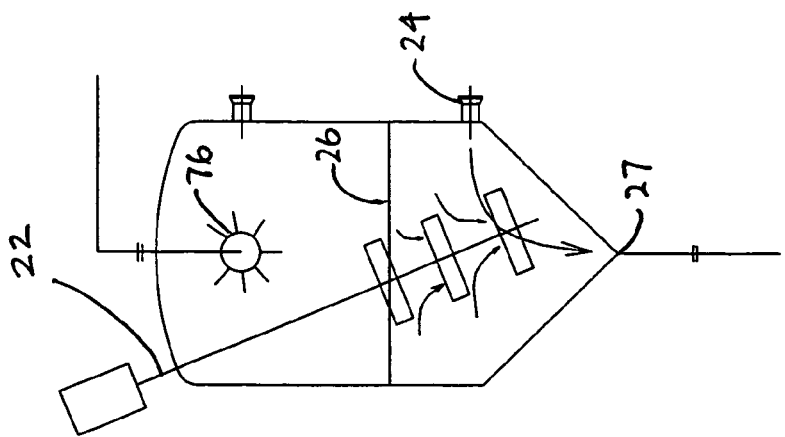
FIG. 3 is a sketch of a vacuum chamber with agitation means.
Figure 2:
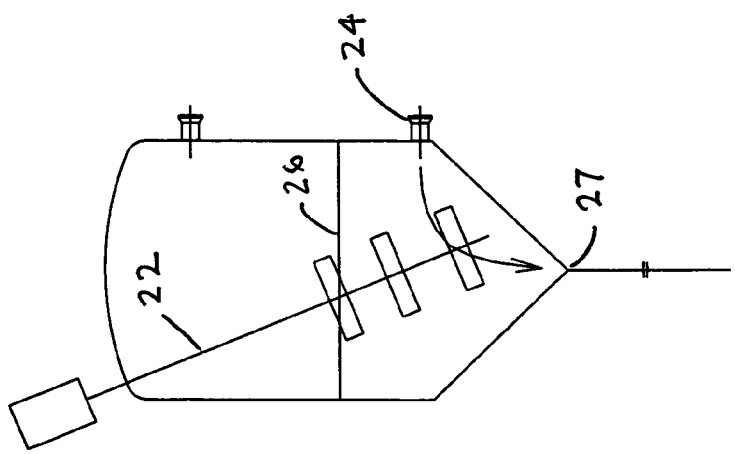
FIG. 2 is a sketch of a vacuum chamber with agitation means.

Referring to FIG. 2 and FIG. 3, an agitator 22 is used to continuously mix the food product while it is in the tank 12. This helps to ensure that the food product stays mixed. Further, to minimize the foaming of the food product, the food product is introduced in a product inlet 24 located below the upper product level 26. While agitator 22 does succeed in ensuring that the food product remains mixed, and the location of food inlet 24 below the food product level 26 minimizes foaming, the amount of air removed form the food product is not optimal. Agitator 22 has a tendency to push the food product down toward the product outlet 27, thereby shortening the amount of time that the food product is exposed to the vacuum. A significant amount of the food product will be pushed from product inlet 24 directly to the product outlet 27 without first reaching the surface of the food product level 26. Where the food product is viscous the air will remain trapped within the food product and not be removed by the vacuum, especially where the food product is not exposed to the vacuum near the top surface of the product level 26.

Figure 4:
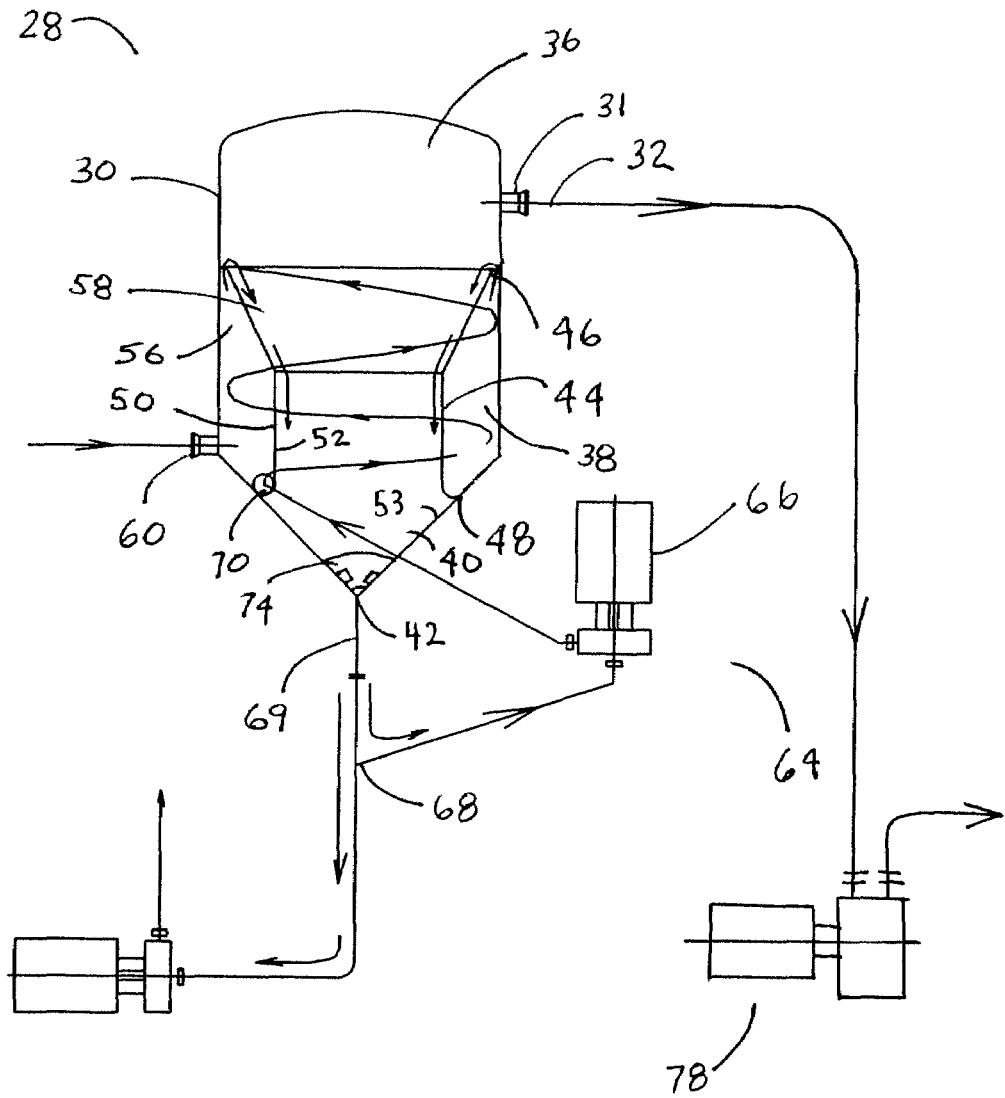
FIG. 4 is a vacuum chamber with a sleeve member and a recirculation system.
Figure 5:
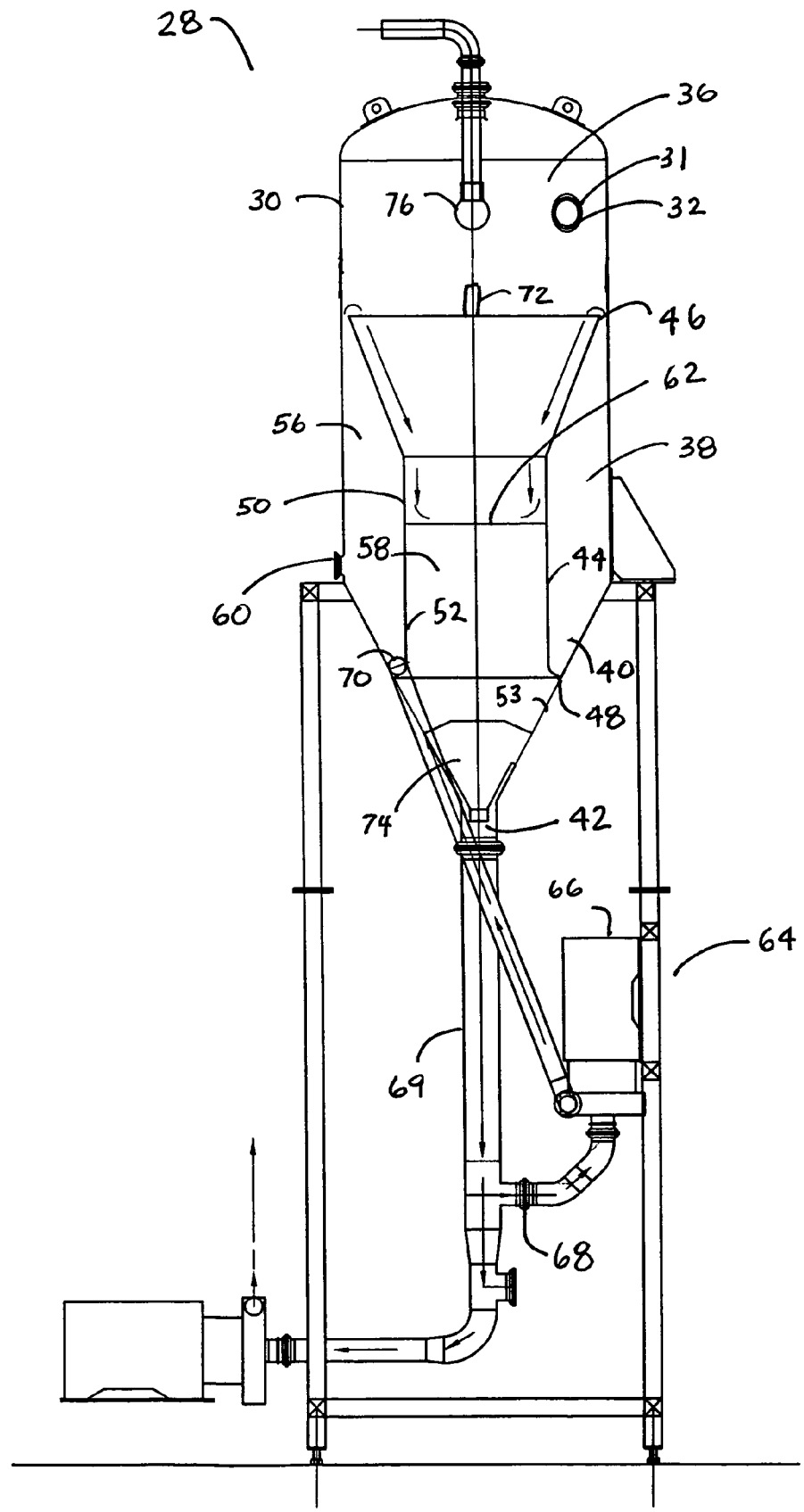
FIG. 5 is a vacuum chamber with a sleeve member and a recirculation system.

Turning now to FIG. 4 and FIG. 5, a vacuum chamber 28 includes a tank 30 with a vacuum inlet 31 located proximate the top portion of tank 30. Vacuum inlet 31 is operatively connected to a vacuum pump 78 with a vacuum line 32. Tank 30 includes an upper region 36, a lower region 38 and a cone shaped region 40 terminating at an outlet 42 through which the food product exits. A hollow cylindrical sleeve 44 is located within the lower region 38 and terminating within the cone shaped region 40. Sleeve 44 includes an upper edge 46 and a lower edge 48. Further, sleeve 44 includes an outer surface 50 and an inner surface 52. In one embodiment, the lower edge 48 of sleeve 44 is welded to the inner surface 53 of the cone shaped region 40. The sleeve 44 creates a first zone 56 between the inner surface of tank 30 and the outer surface 50 of sleeve 44. A second zone 58 is formed by the inner surface 52 of sleeve 44 between the upper edge 46 and the portion of the cone region 40 located within the lower edge 48 of sleeve 44.

The food product enters the tank 30 via a food intake inlet 60 located in the lower region 38 proximate the cone shaped region 40 and tangential to the tank wall. The food product is then forced upwardly by, for example, a pump, in the first zone 56 in a circular motion. The food intake inlet 60 is located below the product surface level in the first zone, thereby minimizing foaming that may take place. The placement of sleeve 44 prevents short circuiting of the incoming food intake. Further, since the food product is forced through a circuitous route, the food product is mixed without the need for a separate agitator. However, a separate mixer/agitator could be added to the second region within the sleeve.

A recirculation system 64 includes a recirculation pump 66 having a pump inlet 68 operatively connected in fluid communication with the exit tube 69 of tank 30. A recirculation inlet or valve 70 is located within the lower portion of first zone 56. A portion of the food product that exits outlet 42 is pumped through the recirculation system 64 back into tank 30. The recirculated food product mixes with the initial food product entering tank 30 via product inlet 60. As a result the initial food product is diluted so that the amount of air in the diluted food product is less than in the initial food product. As the diluted food product moves upward in the first zone into the second zone, the food product is located proximate the food product top surface 62 and therefore exposed to the vacuum in the upper region 36.

The result is that more air is removed from the food product that exits the tank 30 and is finally sent to be packaged or subsequently processed. This is possible because the submerged product inlet 60 brings a steady flow of product with a lot of air in it which is diluted and spread out by the recycled food product that has already been de-aerated. This recycled food product comes tangent with the lower part of the sleeve 44, and a circular motion is imparted which forces the product around the lower level within the first zone 56. Recycled product fills the space and then rises, picking up and mixing with the incoming product, spreading it as it rises with it.

The mixture of incoming initial product through inlet 60 and recycled product through recirculation inlet 70 rises upward reaching the upper edge of sleeve 44 and goes over it. As shown in FIG. 5, an anti-swirl baffle 72 may be provided and located proximate the upper edge 46 of sleeve 44 to allow the mixture of food product to be exposed to the vacuum in upper region 36. Baffle or plate 72 aids in generating vortexes increasing the level surfaces to the maximum and exposing more of the food product to the vacuum in region 36. The resultant product has a minimal amount of air, enters the second zone 58, and is subsequently removed through outlet 42. A second anti-swirl baffle 74 may also be provided and located adjacent the outlet 42 to minimize swirling of the product within the second zone 58. In a preferred embodiment, vacuum chamber 28 does not include any antiswirl baffles.

The amount of recycled food product that is recirculated back to tank 30 is adjusted by changing the speed of the recirculation pump 66. In a preferred embodiment, recirculation pump 66 is a centrifugal pump which allows a sanitary way to drain this tank. The pumping action of recirculation pump 66 with its depressurization followed by pressurization assist in releasing air within the food product. The discharge of the recirculation pump 66 tangentially in tank 30 at the bottom of first zone 56 also contributes to more air being removed from the food product. If top antiswirl plate 72 is utilized, the amount of vortexes generated by top antiswirl plate 72 is adjustable by changing the product level in the chamber and/or by changing the recirculation pump speed.

The introduction of recirculated food product into tank 30 forces the initial product introduced in inlet 60 to dilute in the stream. This has the effect of diluting the amount of air within the food product as well to provide a second opportunity for the food product to be exposed to the vacuum. The arrangement of the sleeve 44 allows the recycled product to swirl together with the fresh product entering inlet 60. When the diluted or combined food product reaches the top of the sleeve 44, the food product is swirling passing a gap then flowing as a thin film on 52 down to the level 62 in the cylinder zone. This exposes the product to the vacuum in a beneficial way effectively removing air from the food product. Since a portion of the food product exiting the tank 30 is recirculated, the product may be exposed several times to the vacuum thereby resulting in a food product that ultimately has little air. The location of the recirculation pump 66 and the location of the recirculation inlet or valve 70 proximate the bottom of the first zone 56 allows for easy cleaning when the tank 30 and system are being cleaned. The removal of air from the system in a tubular system increases the running time, since it helps in preventing protein from depositing or burn-on to occur.

As shown in FIG. 5, a clean-in-place nozzle 76 may also be included within tank 30 in the upper region to allow a cleaning agent to be introduced into the system to clean the system. Although the embodiments described relate to a food product, any viscous product that is being processed may be used in the system as a way of removing air. This new chamber and recirculation pump combines air removal and product agitation.

Referring to FIG. 5, in a preferred embodiment sleeve 44 includes a conical shape such that the diameter of the sleeve proximate the upper edge 46 is greater than the diameter of the sleeve 44 proximate a bottom portion of the sleeve. The term conical as used herein does not require that the shape have a point and includes a frusto-conical shape. The sleeve 44 could also have other shapes such as a cylinder with a constant diameter or with other shapes where the cross section narrows from the upper edge toward the product outlet. The reduction in cross section permits the food product to flow in a thin layer for a distance providing the vacuum the opportunity to remove as much air as possible from the food product.

It is important to note that the construction and arrangement of the system as shown in the various exemplary embodiments is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements and vice versa, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. An apparatus for removing air from a food product comprising:
   a tank including an inner wall and a product inlet and a product outlet;
   a sleeve including an outer surface and an opposing inner surface; the sleeve defining a first zone between the inner wall of the tank and the outer surface of the sleeve, and a second zone between the inner surface of the sleeve and a bottom of the tank; and
   a vacuum pump being operatively connected to the tank and configured to remove air from the food product as it moves from the first zone to the second zone, wherein the vacuum pump is operatively connected to the tank in a region above the first and second zones.

2. The apparatus of claim 1, wherein the sleeve is cylindrical.

3. The apparatus of claim 1, wherein the sleeve includes a conical portion.

4. The apparatus of claim 3, wherein the sleeve includes a first diameter distal the product outlet and a second diameter proximate the product outlet, the first diameter being larger than the second diameter.

5. The apparatus of claim 4, wherein the tank and the sleeve are configured to move food product from the product inlet upward through the first zone over an upper portion of the sleeve and downwardly and inwardly along the inner surface of the sleeve toward the product outlet; the vacuum pump removing air from the food product as the food product moves toward the product outlet in the second zone.

6. The apparatus of claim 5, further including a recirculation system having a recirculation pump configured to return a portion of the food product to the first zone after the food product exits the tank through the product outlet.

7. The apparatus of claim 3, wherein the sleeve includes a cylindrical portion proximate the product inlet between the conical portion and the product outlet.

8. The apparatus of claim 1, wherein the product inlet is horizontal such that the food product moves upwardly in the first zone in a swirling path about a periphery of the inner wall of the tank.

9. An apparatus comprising:
   a vacuum tank including an inner wall and a first product inlet, a second product inlet, and a product outlet;
   a sleeve including an outer surface and an opposing inner surface; the sleeve defining a first zone between the inner wall of the tank and the outer surface of the sleeve, and a second zone between the inner surface of the sleeve and a bottom of the tank;
   a recirculation system including a pump configured to return a portion of the food product to the first zone through the second product inlet after the food product exits the tank through the product outlet; and
   a vacuum pump being operatively connected to the tank in a region above the first and second zones and configured to remove air from the food product as the food product moves from the first zone to the product outlet.

10. The apparatus of claim 9, wherein the sleeve includes a conical portion having a first diameter distal the product outlet and a second diameter proximate the product outlet, the first diameter being larger than the second diameter.

11. The apparatus of claim 10, wherein the tank and the sleeve are configured to move the food product from the first product inlet and the second product inlet upward through the first zone over an upper portion of the sleeve and downwardly and inwardly along the inner surface of the sleeve toward the product outlet; the vacuum pump removing air from the food product as the food product moves toward the product outlet in the second zone.

12. The apparatus of claim 11, wherein the percent of food product to be recirculated may be varied.

13. The apparatus of claim 12, wherein the sleeve includes a cylindrical portion extending from the conical portion and a second conical portion intermediate the cylindrical portion and the product outlet.

14. The apparatus of claim 13, further comprising at least one baffle configured to reduce swirling of the food product within the tank.

15. An apparatus for removing air from a food product comprising:
   a tank including an inner wall and a product inlet and a product outlet;
   a sleeve including an outer surface and an opposing inner surface; the sleeve defining a first zone between the inner wall of the tank and the outer surface of the sleeve, and a second zone between the inner surface of the sleeve and a bottom of the tank; and
   a vacuum pump being operatively connected to the tank and configured to remove air from the food product as it moves from the first zone to the second zone,
   the sleeve including a conical portion and the sleeve including a first diameter distal the product outlet and a second diameter proximate the product outlet, the first diameter being larger than the second diameter,
   wherein the tank and the sleeve are configured to move food product from the product inlet upward through the first zone over an upper portion of the sleeve and downwardly and inwardly along the inner surface of the sleeve toward the product outlet; the vacuum pump removing air from the food product as the food product moves toward the product outlet in the second zone.

16. The apparatus of claim 15, further including a recirculation system having a recirculation pump configured to return a portion of the food product to the first zone after the food product exits the tank through the product outlet.

* * * * *